United States Patent
Soma et al.

(10) Patent No.: US 7,643,013 B2
(45) Date of Patent: Jan. 5, 2010

(54) INPUT DEVICE

(75) Inventors: Masahiro Soma, Fukushima-ken (JP); Kunio Sato, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 615 days.

(21) Appl. No.: 10/938,668

(22) Filed: Sep. 9, 2004

(65) Prior Publication Data
US 2005/0057532 A1    Mar. 17, 2005

(30) Foreign Application Priority Data
Sep. 12, 2003    (JP)    ............... 2003-321540

(51) Int. Cl.
*G06F 3/045* (2006.01)
(52) U.S. Cl. ............... 345/174; 178/18.01; 178/18.06; 178/19.03
(58) Field of Classification Search ......... 345/173–179; 178/18.01–18.07, 19.01–19.06
See application file for complete search history.

(56) References Cited

U.S. PATENT DOCUMENTS

| | | | | |
|---|---|---|---|---|
| 4,743,895 | A | * | 5/1988 | Alexander ................ 345/174 |
| 5,305,017 | A | * | 4/1994 | Gerpheide ................ 345/174 |
| 5,565,658 | A | * | 10/1996 | Gerpheide et al. ....... 178/18.02 |
| 5,801,340 | A | * | 9/1998 | Peter ...................... 178/20.04 |
| 5,867,111 | A | * | 2/1999 | Caldwell et al. ............ 341/33 |
| 6,184,872 | B1 | | 2/2001 | Matsufusa et al. |
| 6,222,528 | B1 | * | 4/2001 | Gerpheide et al. ......... 345/173 |
| 6,262,717 | B1 | * | 7/2001 | Donohue et al. ........... 345/173 |
| 6,680,731 | B2 | * | 1/2004 | Gerpheide et al. ......... 345/173 |
| 7,218,314 | B2 | * | 5/2007 | Itoh ......................... 345/173 |
| 2004/0022010 | A1 | * | 2/2004 | Shigetaka ............... 361/306.3 |

* cited by examiner

*Primary Examiner*—Vijay Shankar
(74) *Attorney, Agent, or Firm*—Brinks Hofer Gilson & Lione

(57) ABSTRACT

A capacitive input device, capable of stably adjusting the sensitivity of a counter electrode to improve the operability of the input device, and of improving the appearance of an electric apparatus is provided. In the input device, a conductive material is arranged between a counter electrode and an inner surface of a casing.

6 Claims, 2 Drawing Sheets

INPUT DEVICE

This application claims the benefit of priority to Japanese Patent Application No. 2003-321540 filed on Sep. 12, 2003, herein incorporated by reference.

BACKGROUND OF THE INVENTION

1. Field of the Invention

The present invention relates to a capacitive input device used as, for example, a pointing device of a personal computer.

2. Description of the Related Art

In recent years, capacitive input devices have been generally used for various electric apparatuses called portable terminals, such as mobile phones, cameras, and PDAs (Personal Digital Assistants).

As an example of the input devices, an input device has been known in which a counter electrode having a predetermined area adheres to an inner surface of a casing of an electric apparatus. In such an input device, the counter electrode is formed of a sheet-shaped conductive metal plate, such as a thin copper plate, and is provided along the inner surface of the casing so as to have a little large area. Since the counter electrode is formed of a very thin film, it is possible for the counter electrode to adhere to the inner surface of the casing so as to correspond to the curved surface of the casing. When a conductor, such as a finger, approaches and comes into contact with an outer surface of the casing opposite to the counter electrode, capacitance is formed between the conductor and the counter electrode. The capacitance varies according to the area and distance where the counter electrode and the conductor are opposite to each other.

The casing is made of a material having a high dielectric constant other than a metallic material, that is, synthetic resin, such as plastic.

Further, the input device comprises detecting means for detecting the capacitance, clock signal generating means, signal delay means, delayed signal detecting means, and A/D converting means.

The clock signal generating means continuously outputs a regular pulse signal having a predetermined frequency. The signal delay means comprises a variable capacitance portion and a resistor R connected between the variable capacitance portion and the clock signal generating means. In addition, the delayed signal detecting means includes an AND circuit and smoothing means comprising a resistor and a capacitor that are connected to the rear stage of the AND circuit. A clock signal that is output from the clock signal generating means and does not pass through the signal delay means and another clock signal that is output from the clock signal generating means and passes through the signal delay means are input to input portions of the AND circuit, respectively. Then, the output of the AND circuit is input to the smoothing means. The A/D converting means detects an output voltage from the smoothing means at a predetermined sampling period and converts it into a digital signal. Then, the A/D converting means outputs the digital signal to a control unit composed of a CPU. Then, the control unit obtains various information items from the digital signal output from the A/D converting means, and allows an electric apparatus to perform a predetermined operation based on the information items (for example, see Japanese Patent Application No. 2002-306887).

However, in the conventional capacitive input device having the above-mentioned structure, in the case in which the counter electrode adheres to the inner surface of the casing of the electric apparatus, if it is difficult for the counter electrode to adhere to the inner surface due to the positional relationship therebetween, the counter electrode must adhere to an inner case of the electric apparatus. In this case, a space, that is, an air layer may be formed between the surface of the counter electrode and the casing of the electric apparatus. When a space is formed between the surface of the counter electrode and the casing of the electric apparatus, it is difficult to adjust the sensitivity of the counter electrode, resulting in lowering the operability of the input device.

Further, a recent trend in various electric apparatuses is to provide casings having a metallic tone. Therefore, when the surface of the casing, which is an operating surface, is made of a metallic material or is plated with a metallic material, the erroneous operation of the counter electrode may occur due to the conductivity of the metallic material. Thus, the surface of the casing must be made of a non-conductive material, such as resin, which results in deteriorating the appearance of the electric apparatus.

SUMMARY OF THE INVENTION

Accordingly, the present invention is designed to solve the above-mentioned problems, and it is an object of the present invention to provide a capacitive input device capable of stably adjusting the sensitivity of a counter electrode to improve the operability of the input device without deteriorating the appearance of an electric apparatus when the counter electrode adheres to an inner case of the electric apparatus.

In order to achieve the above-mentioned object, a first aspect of the present invention provides a capacitive input device for detecting the capacitance-generated between a counter electrode adhered to an inner surface of a casing and a conductor that approaches or comes into contact with an outer surface of the casing to detect coordinates of the conductor, wherein a conductive material is arranged between the inner surface of the casing and the counter electrode.

Further, a second aspect of the present invention provides a capacitive input device for detecting the capacitance generated between a plurality of counter electrodes adhered to an inner surface of a casing and a conductor that approaches or comes into contact with an outer surface of the casing to detect coordinates of the conductor, wherein a conductive material is arranged between the inner surface of the casing and the counter electrodes so as to be formed on the respective counter electrodes.

Furthermore, according to a third aspect of the present invention, in the capacitive input device having the above structure, the conductive material is formed larger than the area of the counter electrode.

Moreover, according to a fourth aspect of the present invention, in the capacitive input device having the above structure, a non-conductive metal film is deposited on the outer surface of the casing.

DESCRIPTION OF THE PREFERRED EMBODIMENTS

Hereinafter, embodiments of an input device according to the present invention will be described with reference to the accompanying drawings.

Figure 1:
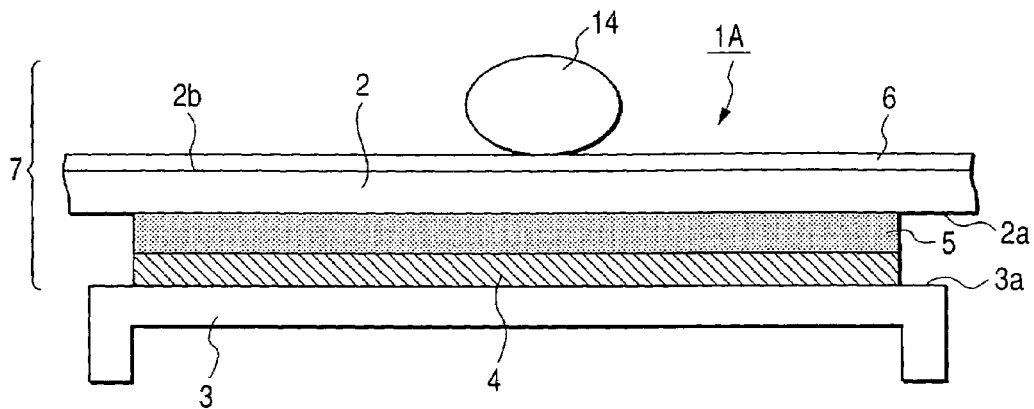
FIG. 1 is a cross-sectional view schematically illustrating a first embodiment of an input device according to the present invention.
Figure 2:
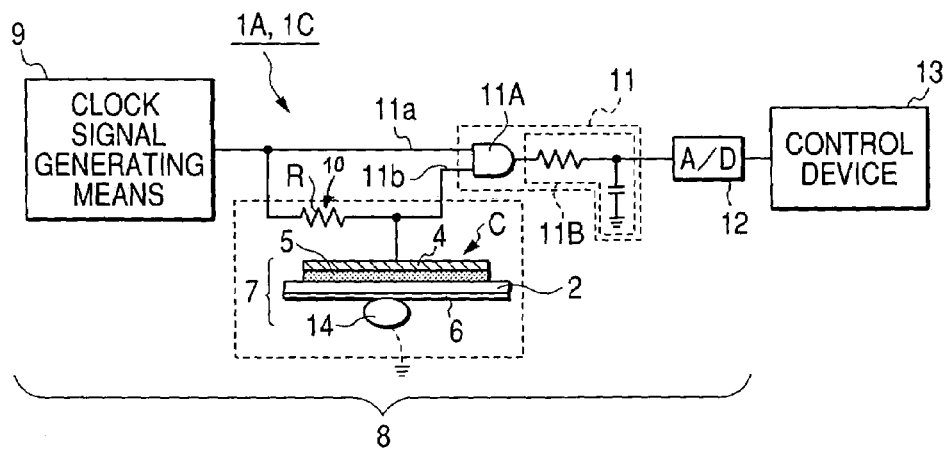
FIG. 2 is a block diagram illustrating the structure of the input device according to the first and third embodiments of the present invention.
Figure 3:
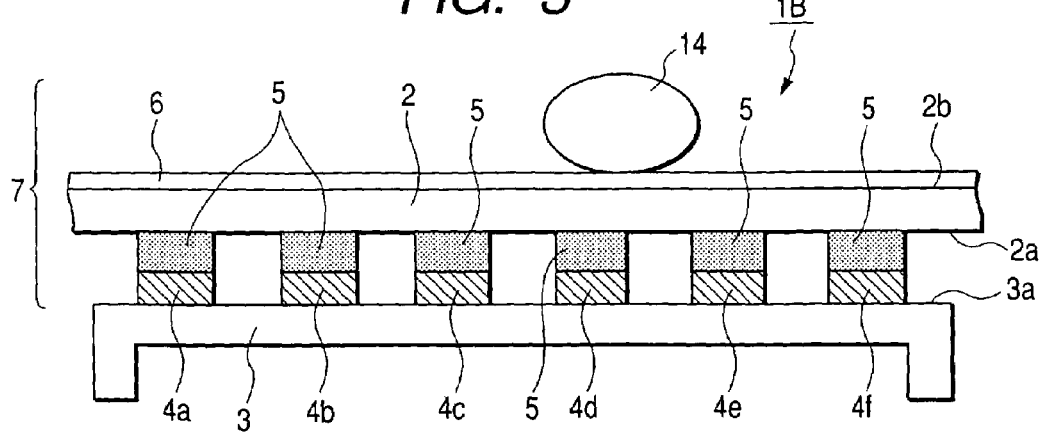
FIG. 3 is a cross-sectional view schematically illustrating a second embodiment of the input device according to the present invention.
Figure 4:
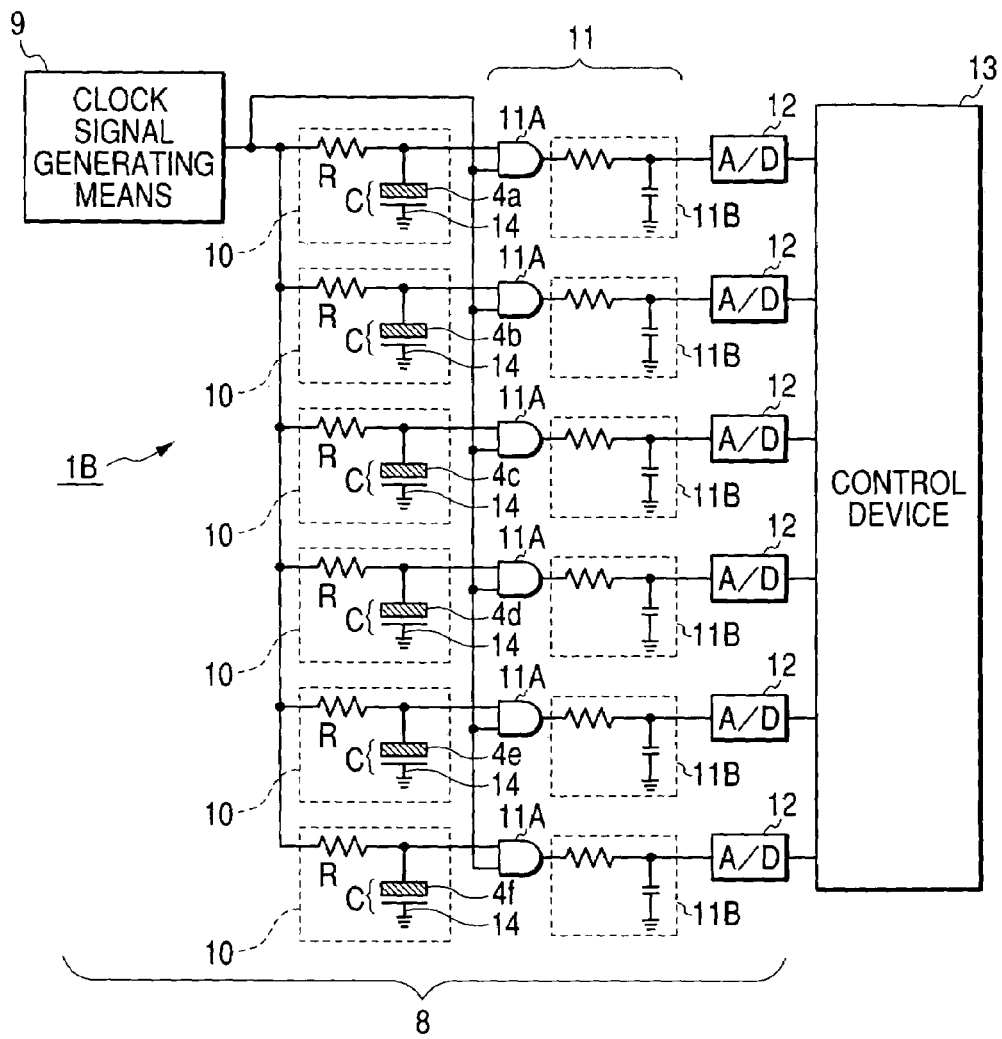
FIG. 4 is a block diagram illustrating the structure of the input device according to the second embodiment of the present invention.
Figure 5:
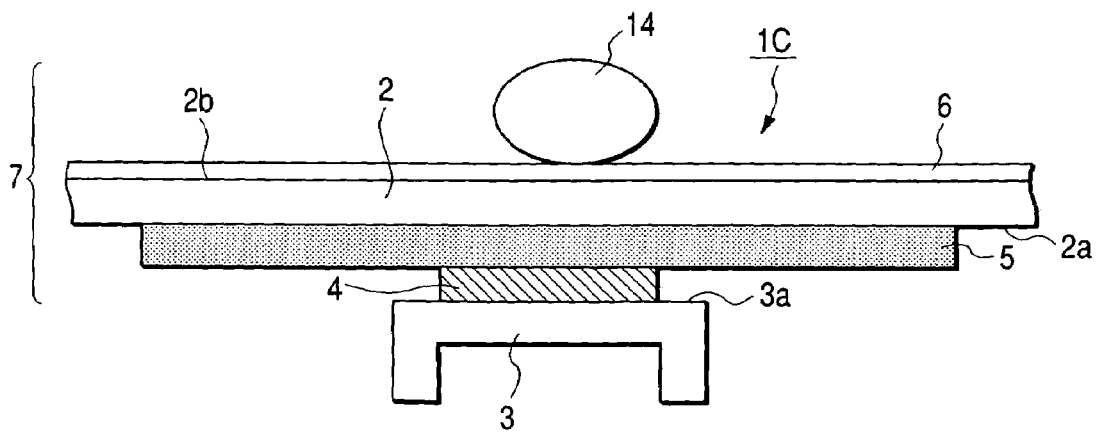
FIG. 5 is a cross-sectional view schematically illustrating the third embodiment of the input device according to the present invention.

FIG. 1 is a cross-sectional view schematically illustrating a first embodiment of an input device according to the present invention. FIG. 2 is a block diagram illustrating the structure of the input device according to the first and third embodiments. FIG. 3 is a cross-sectional view schematically illustrating a second embodiment of the input device according to the present invention. FIG. 4 is a block diagram illustrating the structure of the input device according to the second embodiment. FIG. 5 is a cross-sectional view schematically illustrating the third embodiment of the input device according to the present invention.

As shown in FIG. 1, in an input device 1A according to the first embodiment, a counter electrode 4 adheres to an outer surface 3a of an inner case 3 in a casing 2 of an electric apparatus, such as a personal computer, a PDA, or a mobile phone, and a conductive material 5 is arranged on the counter electrode 4 so as to fill up an air layer, that is, a space between the inner surface 2a of the casing 2 and the counter electrode 4.

Further, a non-conductive metal film 6 is deposited on an outer surface (an operating surface) 2b of the casing 2 by a non-conductive sputter such that metal particles of the non-conductive metal film 6 are not bonded to each other.

Capacitance C is formed between the counter electrode 4 and a conductor 14, such as a finger, for operating the operating surface 2b of the casing 2 with the conductive material 5 interposed therebetween, and a variable capacitance portion 7 is formed between the counter electrode 4 and the conductor 14. Therefore, the capacitance C varies according to the area and distance where the counter electrode 4 and the conductor 14 are opposite to each other.

Furthermore, as shown in FIG. 2, the input device 1A is provided with detecting means 8 for detecting the variation of the capacitance C when the operating surface 2b of the casing 2 is operated by the conductor 14. The detecting means 8 comprises clock signal generating means 9, signal delay means 10, and delayed signal detecting means 11.

The clock signal generating means 9 continuously outputs a regular pulse signal having a predetermined frequency. The signal delay means 10 comprises the counter electrode 4 and a resistor R connected between the counter electrode 4 and the clock signal generating means 9. In addition, the delayed signal detecting means 11 includes an AND circuit 11A and smoothing means 11B comprising a resistor and a capacitor that are connected to the rear stage of the AND circuit 11A. A clock signal (which does not pass through the signal delay means 10) output from the clock signal generating means 9 and another clock signal passing through the signal delay means 10 are input to input portions 11a and 11b of the AND circuit 11A, respectively. Then, the output of the AND circuit 11A is input to the smoothing means 11B.

Further, A/D converting means 12 is connected to the last stage of the detecting means 8, that is, to the rear stage of the smoothing means 11B of the delayed signal detecting means 11. The A/D converting means 12 detects an output voltage from the smoothing means 11B at a predetermined sampling period and converts it into a digital signal. Then, the A/D converting means 12 outputs the digital signal to a control device 13 to perform the desired control on an electric apparatus.

Next, the operation of the input device 1A having the above-mentioned structure will be described below.

In the input device 1A according to the first embodiment having the above-mentioned structure, when the conductor 14, such as a pen or a finger, approaches or comes into contact with the operating surface 2b of the casing 2 on which the non-conductive metal film 6 is deposited by a non-conductive sputter to move in a predetermined direction, the capacitance C generated between the counter electrode 4 and the conductor 14 with the conductive material 5 interposed therebetween varies, and the variation of the capacitance C is detected by the detecting means 8. Then, the digital signal output from the detecting means 8 according to the detected variation of the capacitance C is output to the control device 13 of the electric apparatus, thereby performing the desired control on the electric apparatus.

According to the input device 1A of the first embodiment having the above-mentioned structure, since the conductive material 5 is interposed between the counter electrode 4 and the inner surface 2a of the casing 2 of the electric apparatus so as to fill up the air layer, that is, the space therebetween, it is possible to normally detect the variation of the capacitance C of the counter electrode 4 and to secure the sensitivity of the input device 1A, thereby improving operability.

Further, the metal film 6 is deposited on the operating surface 2b of the casing 2 of the electric apparatus by a non-conductive sputter such that metal particles of the metal film 6 are not bonded to each other. Therefore, it is possible to make the operating surface 2b of the casing 2 of the electric apparatus have a metallic tone while securing the sensitivity of the counter electrode 4 and to prevent the appearance of the electric apparatus from being deteriorated.

Next, an input device 1B according to the second embodiment will be described below. As shown in FIG. 3, in the input device 1B according to the second embodiment, a plurality of counter electrodes 4a, 4b, 4c, 4d, 4e, and 4f (six counter electrodes are used in the present embodiment) adheres to an outer surface 3a of an inner case 3 in a casing 2 of an electric apparatus, such as a personal computer, a PDA, or a mobile phone, and a conductive material 5 is arranged on the respective counter electrodes 4a to 4f so as to fill up an air layer, that is, a space between the inner surface 2a of the casing 2 and the respective counter electrodes 4a to 4f.

Further, a non-conductive metal film 6 is deposited on an operating surface 2b of the casing 2 by a non-conductive sputter such that metal particles of the non-conductive metal film 6 are not bonded to each other.

Capacitances C are respectively formed between the respective counter electrodes 4a to 4f and a conductor 14, such as a finger, for operating the operating surface 2b of the casing 2 with the conductive material 5 interposed therebetween, and variable capacitance portions 7 are formed between the respective counter electrodes 4a to 4f and the conductor 14, respectively. Therefore, the capacitances C vary according to the areas and distances where the respective counter electrodes 4a to 4f and the conductor 14 are opposite to each other.

Furthermore, as shown in FIG. 4, the input device 1B is provided with detecting means 8 for detecting the variation of the capacitance C of the respective counter electrodes 4a to 4f when the operating surface 2b of the casing 2 is operated by the conductor 14. The detecting means 8 comprises signal delay means 10 (the respective counter electrodes 4a to 4f and resistors R) provided for every counter electrode 4a to 4f, delayed signal detecting means 11 (AND circuits 11A and smoothing means 11B), A/D converting means 12, and clock signal generating means 9. When digital signals output from the respective A/D converting means 12 are added, it is possible to detect a ratio of the total area of the respective counter electrodes 4a to 4f to the area where the conductor 14 for operating the operating surface 2b of the casing 2 is opposite to the respective counter electrodes 4a to 4f. In addition, the detecting means 8 detects a temporal change in the area where the respective counter electrodes 4a to 4f and the conductor 14 are opposite to each other as the conductor 14 moves to operate the operating surface 2b of the casing 2, and the variation of the capacitance C of the respective counter electrodes 4a to 4f detected by the detecting means 8 is output to the control device 13 as digital signals, thereby performing the desired control on the electric apparatus using the control device 13.

Next, the operation of the input device 1B having the above-mentioned structure will be described below.

In the input device 1B according to the second embodiment having the above-mentioned structure, when the conductor 14, such as a pen or a finger, approaches or comes into contact with the operating surface 2b of the casing 2 on which the non-conductive metal film 6 is deposited by a non-conductive sputter to move in a predetermined direction, the respective capacitances C generated between the respective counter electrodes 4a to 4f and the conductor 14 with the conductive material 5 interposed therebetween vary, and the variation of the capacitances C is detected by the detecting means 8. Then, the digital signal output from the detecting means 8 according to the detected variation of the capacitances C is output to the control device 13 of the electric apparatus, thereby performing the desired control on the electric apparatus.

According to the input device 1B of the second embodiment having the above-mentioned structure, since the conductive material 5 is arranged between the respective counter electrodes 4a to 4f and the inner surface 2a of the casing 2 of the electric apparatus so as to fill up the air layer, that is, the space therebetween, it is possible to normally detect the variation of the capacitances C of the respective counter electrodes 4a to 4f and to secure the sensitivity of the input device 1B, thereby improving operability.

Further, the metal film 6 is deposited on the operating surface 2b of the casing 2 of the electric apparatus by a non-conductive sputter such that metal particles of the metal film 6 are not bonded to each other. Therefore, it is possible to make the operating surface 2b of the casing 2 of the electric apparatus have a metallic tone while securing the sensitivity of the respective counter electrodes 4a to 4f and thus to prevent the appearance of the electric apparatus from being deteriorated.

Next, an input device 1C according to the third embodiment will be described below. As shown in FIG. 5, in the input device 1C according to the third embodiment, a counter electrode 4 adheres to an outer surface 3a of an inner case 3 in a casing 2 of an electric apparatus, such as a personal computer, a PDA, or a mobile phone, and a conductive material 5 is arranged on the counter electrode 4 so as to fill up an air layer, that is, a space between the inner surface 2a of the casing 2 and the counter electrode 4.

In the third embodiment, the conductive material 5 is formed larger than the area of the counter electrode 4.

Further, a non-conductive metal film 6 is deposited on an operating surface 2b of the casing 2 by a non-conductive sputter such that metal particles of the non-conductive metal film 6 are not bonded to each other.

Capacitance C is formed between the counter electrode 4 and a conductor 14, such as a finger, for operating the operating surface 2b of the casing 2 with the conductive material 5 interposed therebetween, and a variable capacitance portion 7 is formed between the counter electrode 4 and the conductor 14. Therefore, the capacitance C varies according to the area and distance where the counter electrode 4 and the conductor 14 are opposite to each other.

Furthermore, as shown in FIG. 2, the input device 1C is provided with detecting means 8 for detecting the variation of the capacitance C when the operating surface 2b of the casing 2 is operated by the conductor 14, and the detecting means 8 has the same structure as that in the first embodiment. Therefore, in the present embodiment, a detailed description of the detecting means 8 will be omitted for the simplicity of explanation.

Next, the operation of the input device 1C having the above-mentioned structure will be described below.

In the input device 1C according to the third embodiment having the above-mentioned structure, when the conductor 14, such as a pen or a finger, approaches or comes into contact with the operating surface 2b of the casing 2 on which the non-conductive metal film 6 is deposited by a non-conductive sputter to move in a predetermined direction, the capacitance C generated between the counter electrode 4 and the conductor 14 with the conductive material 5 interposed therebetween varies, and the variation of the capacitance C is detected by the detecting means 8. Then, the digital signal output from the detecting means 8 according to the detected variation of the capacitances C is output to the control device 13 of the electric apparatus, thereby performing the desired control on the electric apparatus.

Further, the conductive material 5 arranged between the counter electrode 4 and the inner surface 2a of the casing 2 is formed larger than the area of the counter electrode 4. Therefore, the area of the operating surface 2b can be larger than the area of the counter electrode 4.

According to the input device 1C of the third embodiment having the above-mentioned structure, since the conductive material 5 is arranged between the counter electrode 4 and the inner surface 2a of the casing 2 of the electric apparatus so as to fill up the air layer, that is, the space therebetween, it is possible to normally detect the variation of the capacitance C of the counter electrode 4 and to secure the sensitivity of the input device 1C, thereby improving operability.

Further, since the conductive material 5 is formed larger than the area of the counter electrode 4, the area of the operating surface 2b can be larger than the area of the counter electrode 4.

Furthermore, the metal film 6 is deposited on the operating surface 2b of the casing 2 of the electric apparatus by a non-conductive sputter such that metal particles of the metal film 6 are not bonded to each other. Therefore, it is possible to make the operating surface 2b of the casing 2 of the electric apparatus have a metallic tone while securing the sensitivity of the counter electrode 4 and thus to prevent the appearance of the electric apparatus from being deteriorated.

Moreover, the present invention is not limited to the above-mentioned embodiments, and various modifications can be made without departing from the scope and spirit of the invention if necessary.

As described above, according to the present invention, in the capacitive input device in which the counter electrode adheres to the inner case of the electric apparatus, since the conductive material is arranged between the counter electrode and the inner surface of the casing, it is possible to stably adjust the sensitivity of the counter electrode to improve the operability of the input device.

Further, since the conductive material is arranged between the counter electrode and the inner surface of the casing so as to be formed larger than the area of the counter electrode, it is possible to make the area of the operating surface of the input device larger than the area of the counter electrode.

Furthermore, since a non-conductive metal film is deposited on the casing, it is possible to improve the appearance of an electric apparatus having a metallic tone and also to prevent the erroneous operation of the counter electrode due to the non-conductive metal film.

What is claimed is:

1. A capacitive input device for detecting the capacitance generated between a counter electrode adhered to an inner surface of a casing and a conductor that approaches or comes into contact with an outer surface of the casing to detect coordinates of the conductor,
    wherein a conductive material is arranged between the inner surface of the casing and the counter electrode and the conductive material includes an area at least equal to an area of the counter electrode, the conductive material further arranged so as to fill up an air layer between the inner surface of the casing and the counter electrode, and
    wherein the capacitance is generated between the counter electrode and the conductor via the conductive material.

2. A capacitive input device for detecting the capacitance generated between a plurality of counter electrodes adhered to an inner surface of a casing and a conductor that approaches or comes into contact with an outer surface of the casing to detect coordinates of the conductor,
    wherein a conductive material is arranged between the inner surface of the casing and the counter electrodes so as to be formed on the respective counter electrodes and the conductive material includes an area at least equal to an area of the respective counter electrodes, the conductive material further arranged so as to fill up an air layer between the inner surface of the casing and the counter electrode, and
    wherein the capacitance is generated between the respective counter electrodes and the conductor via the conductive material.

3. The capacitive input device according to claim 1,
    wherein the conductive material is formed larger than the area of the counter electrode.

4. The capacitive input device according to claim 1,
    wherein a non-conductive metal film is deposited on the outer surface of the casing.

5. The capacitive input device according to claim 2,
    wherein the conductive material is formed larger than the areas of the counter electrodes.

6. The capacitive input device according to claim 2,
    wherein a non-conductive metal film is deposited on the outer surface of the casing.

* * * * *

UNITED STATES PATENT AND TRADEMARK OFFICE
CERTIFICATE OF CORRECTION

PATENT NO.        : 7,643,013 B2
APPLICATION NO. : 10/938668
DATED             : January 5, 2010
INVENTOR(S)       : Soma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 992 days.

Signed and Sealed this

Sixteenth Day of November, 2010

David J. Kappos
*Director of the United States Patent and Trademark Office*